United States Patent [19]

Keith et al.

[11] Patent Number: 5,519,973
[45] Date of Patent: May 28, 1996

[54] HIGHLY INSULATIVE CONNECTOR RODS AND METHODS FOR THEIR MANUFACTURE AND USE IN HIGHLY INSULATED COMPOSITE WALLS

[75] Inventors: David O. Keith; David M. Hansen, both of American Fork, Utah

[73] Assignee: H.K. Composites, Inc., Orem, Utah

[21] Appl. No.: 225,910

[22] Filed: Apr. 8, 1994

Related U.S. Application Data

[63] Continuation-in-part of Ser. No. 11,867, Aug. 17, 1993.

[51] Int. Cl.$^6$ .................................. E04B 1/62; E04B 5/00
[52] U.S. Cl. ...................... 52/410; 52/309.7; 52/309.11; 52/511; 411/387; 411/487; 411/439
[58] Field of Search ...................... 52/410, 309.7, 52/309.11, 309.12, 511, 513, 514, 713; 411/387, 482, 487, 439, 441, 446, 450, 452

[56] References Cited

U.S. PATENT DOCUMENTS

| | | | |
|---|---|---|---|
| 2,412,744 | 12/1946 | Nelson | 72/16 |
| 2,575,079 | 11/1951 | Temple | 411/482 X |
| 2,595,123 | 4/1952 | Callan | 25/154 |
| 2,645,929 | 7/1953 | Jones | 72/103 |
| 2,653,469 | 9/1953 | Callan | 72/50 |
| 2,718,138 | 9/1955 | Jones | 72/48 |
| 2,769,333 | 11/1956 | Reintjes | 72/19 |
| 2,775,018 | 12/1956 | McLaughlin | 25/131 |
| 2,964,821 | 12/1960 | Meehan | 25/131 |
| 3,000,144 | 9/1961 | Kitson | 50/268 |
| 3,131,514 | 5/1964 | Siek | 50/272 |
| 3,208,328 | 9/1965 | Myers | 411/487 X |
| 3,304,676 | 2/1967 | Sallie et al. | 51/276 |
| 3,426,494 | 2/1969 | Hala | 52/410 |
| 3,523,359 | 8/1970 | Rutter et al. | 52/410 |
| 3,646,715 | 3/1972 | Pope | 52/309 |
| 3,701,228 | 10/1972 | Taylor | 52/309 |
| 3,750,355 | 8/1973 | Blum | 52/309 |
| 3,869,219 | 3/1975 | Wilson et al. | 411/387 X |
| 3,879,908 | 4/1975 | Weismann | 52/309 |
| 4,018,023 | 4/1977 | Anderson | 52/410 X |
| 4,157,001 | 6/1979 | Pickles | 52/506 |
| 4,329,821 | 5/1982 | Long et al. | 52/309.12 |
| 4,348,847 | 9/1982 | Jukes | 52/426 |
| 4,393,635 | 7/1983 | Long | 52/309.11 |
| 4,545,163 | 10/1985 | Asselin | 52/378 |

(List continued on next page.)

OTHER PUBLICATIONS

R. Layne, *Concrete–Plastic Sandwich Forms Walls Fast,* Popular Science, p. 1 (Sep. 1095).
*Sandwich Wall panels for Expanded Corporate Offices and Warehouse,* CI Journal, pp. 148–52 (Jul.–Aug. 1979).
W. E. Yates, *Lightweight Cladding Cuts Costs at Worthing,* Concrete, pp. 12–13 (Dec. 1979).
P. Juhnke, *Tilt–Up Panels, Possible Key to Low–Cost Concrete Houses,* Concrete Construction, vol. 15, No. 5, pp. 156–157 (May 1970).
Composite Technologies Corporation product brochure for "Thermomass Building System" (1990).
Composite Technologies Corporation product brochure for "Thermomass Building System" (date unknown).

*Primary Examiner*—Carl D. Friedman
*Assistant Examiner*—Winnie S. Yip
*Attorney, Agent, or Firm*—Workman, Nydegger & Seeley

[57] ABSTRACT

Highly insulating connector rods used in making highly insulative composite wall structures are disclosed. The high R-value connector is injection molded in a single step from an appropriate resinous material or moldable plastic. Discontinuous fibers may be impregnated within the resinous material or other plastic. The connector rod has a pointed end for facilitating entry through an insulating layer and a first structural layer and an enlarged head for receiving an impact from a hammer or mallet. The enlarged head also provides an anchoring effect within a second structural layer. A ridge or flange helps to orient the connector rod when inserted into the insulating material and also helps to prevent the collapse of the second structural layer toward the first structural layer.

13 Claims, 4 Drawing Sheets

U.S. PATENT DOCUMENTS

| | | | |
|---|---|---|---|
| 4,568,215 | 2/1986 | Nelson | 52/511 X |
| 4,624,089 | 11/1986 | Dunker | 52/410 |
| 4,702,053 | 10/1987 | Hibbard | 52/309.7 |
| 4,829,733 | 5/1989 | Long | 52/309.11 |
| 4,907,928 | 3/1990 | Beck et al. | 411/387 |
| 4,932,819 | 6/1990 | Almeras | 52/410 X |
| 4,945,700 | 8/1990 | Powell | 52/514 |
| 4,948,312 | 8/1990 | Jochum | 411/411 X |
| 4,973,211 | 11/1990 | Potucek | 411/452 |
| 5,011,354 | 4/1991 | Brownlee | 411/439 |
| 5,031,378 | 7/1991 | Murphy | 52/410 X |
| 5,094,057 | 3/1992 | Morris | 52/511 |
| 5,265,998 | 11/1993 | Kluser | 52/410 X |

HIGHLY INSULATIVE CONNECTOR RODS AND METHODS FOR THEIR MANUFACTURE AND USE IN HIGHLY INSULATED COMPOSITE WALLS

RELATED APPLICATIONS

This application is a continuation-in-part of copending design application Ser. No. 29/011,867, entitled "Insulating Wall Tie For Concrete Sandwich Walls" and filed Aug. 17, 1993, in the names of David O. Keith and David M. Hansen. For purposes of disclosure that application is incorporated herein by specific reference.

BACKGROUND OF THE INVENTION

1. Field of the Invention

This invention relates to highly insulative connector rods used to secure together multiple layers of material within a composite wall structure. In particular, the high shear strength connector rods have a high R value and are used to join together a highly insulating layer sandwiched between concrete layers on either side of the insulating layer.

2. The Relevant Technology

As new materials and compositions have been continuously developed, novel methods of synergistically combining apparently unrelated materials to form useful composites have also been developed. This is true of the area of building and construction in which high strength structural walls have been fabricated and then coated or layered with highly insulative materials having relatively low strength to provide a structure of both high strength and high insulation. In general, the structural component is built first; thereafter an insulating mat is attached to the structural component. More particularly, an outer wall structure is erected, an insulating material is placed on the inside of the outer wall structure, and an inner wall is placed over the insulating material to protect and hide it. The purpose of the insulation is to prevent, or at least slow, the transfer of thermal energy between the inner and outer walls. A commonly used measurement of the thermal insulating qualities of a material is the mathematical coefficient "R". As used in the art, the coefficient R is equal to the inverse of the coefficient "K." The coefficient K is used as a mathematical designation for the thermal conductivity of a material. Its value is determined by the molecular structure of the material, and provides a measurement of the inherent heat transference properties of the material. The coefficient R accordingly represents the inverse of conductivity, or in other words, is a measurement of the thermal resistance, or inherent quality of the insulating ability, of the material. A "high R value" material or device therefore possesses high thermal resistance or insulating ability. The outer wall generally provides the majority of the structural support of the building and will be made of a high strength material.

For example, one of the least expensive and strongest building materials that has found extensive use in the construction industry is concrete, which is formed from a mixture comprising a hydraulic cement binder, water and a relatively low cost and high compressive strength aggregate material, such as rocks, pebbles and sand. Together these form a relatively high strength, low cost building material. Unfortunately, concrete has the drawback of offering poor insulation compared to highly insulating materials such as fiberglass or polymeric foam materials. While an 8 inch slab of concrete has an R value of 0.64, a 1 inch panel of polystyrene has an R value of 5.0. However, these latter materials, while highly insulative, also have the drawback of offering little in terms of structural strength or integrity. Although structural walls made of cement or masonry can be fitted and even retrofitted with any number of insulating materials, including insulating mats or foams that are sprayed between an inner and outer wall, the insulation material is not able to impart the most efficient insulation possible due to the required structural bridging of the outer structural wall with the inner structural wall.

Such structural bridging is necessary in order for the two-wall structure to have high strength and integrity and to prevent the two walls from collapsing together or separating apart during construction and subsequent use of the building. This has usually been accomplished through the use of metal studs, bolts, or beams. However, because metal is a very good conductive material (and therefore has very low insulation), such studs, bolts, beams, or other means for structurally bridging the two walls together also create a conduit or conductive thermal bridge across which heat can readily flow, notwithstanding their being surrounded by ample amounts of an insulating material. As a result, heat can rapidly flow from a relatively warm inside wall to a colder outside wall during cold weather, for example. Therefore, although an insulating material may have a relatively high R value, the net R value of the two walls can often be far less, thus negating or minimizing the effect of adding additional layers of insulation. Of course, one might construct a building having no structural bridges between the inner and out or walls with the result being a wall having inadequate strength for most building needs.

In order to overcome these deficiencies some have attempted to pour two separate concrete slab walls with a highly insulative layer such as polystyrene foam sandwiched between the two concrete walls. For example, the following U.S. Patents disclose such a composite wall structure held together using metal tie rods or studs: U.S. Pat. Nos. 4,393,635 to Long, 4,329,821 to Long et al., 2,775,018 to McLaughlin, 2,645,929 to Jones, and 2,412,744 to Nelson. Unfortunately, as soon as metal studs or connectors are used to structurally tie together the two concrete walls, the highly insulating effect of the polystyrene foam is substantially lost due to the thermal bridging effect of the highly conductive metal studs or connectors. Thus, the polystyrene foam or other high R-value insulating material is unable to impart the full level of insulation possible because of the conductive thermal bridges.

In order to substantially overcome the problems of thermal bridging, others have begun to employ the use of tie rods having a metal portion passing through the concrete layers and a thermally insulating portion passing through the insulating layer (e.g., U.S. Pat. No. 4,545,163 to Asselin). Others have developed highly insulative connector rods that are made entirely from high R-value materials in order to connect together the two concrete structural layers while minimizing the thermal bridging effect between the outer concrete layers. For example, U.S. Pat. No. 4,829,733 to Long (hereinafter the "Long 733 Patent") discloses a plastic shear connector for forming an insulated wall having inner and outer concrete structural layers with highly insulating layers sandwiched therebetween. Although the plastic shear connector described in the Long '733 Patent has found some use in the construction industry, both the design of the connector described therein as well as the method for making such a connector create added materials, manufacturing and labor costs due to the relatively difficult method of forming the connector set forth in the Long '733 Patent, as well as the manner in which it is used.

For example, the manufacture of the Long '733 Patent connector requires at least five basic manufacturing steps, and possibly more, due to the materials used to form the connector, as well as the design of the connector. First of all, the Long '733 Patent Connector includes two separate pieces formed by different manufacturing methods and from different materials which must be fastened together to form the Long '733 Patent connector.

On the one hand, the flat, elongate portion which extends through the entire length of the Long '733 Patent connector is formed from a continuous fiber, such as glass, graphite or boron, which has been impregnated with a polyester vinyl ester epoxy or other suitable polymer binder. Although no manufacturing process for forming the flat, elongate portion is disclosed within the Long '733 Patent, the most economical and reliable method of forming a flat, elongate rod having the proper dimensions is by pultrusion. Because pultrusion (like extrusion) yields articles of uniform cross section, the flat, elongate portion must further be cut to length and then machined in order to provide the tapered portions that are necessary to retain the connector within the hardened concrete slabs. Hence, three separate manufacturing steps are required to create the flat, elongate portion alone.

In addition, the central sleeve portion must be separately molded by, for example, injection molding, and then be separately mounted over the central portion of the flat, elongate portion (column 3, lines 2–4). One of the purposes of the central sleeve portion is to provide a flange which bears on the sidewall of the insulation sheet to prevent the Long '733 Patent connector from penetrating too far or too little within the different layers of the composite wall structure (column 3, lines 4–8). Because the flat, elongate portion is formed by pultrusion, the flange of the central sleeve portion cannot be formed in one step. Thus, while providing a connector having superior insulation and strength, the Long '733 Patent only discloses a shear connector having a very highly specialized design and method of manufacture.

The Long '733 Patent also discloses a connector whose design limitations further complicate its use in the manufacture of composite wall structures. For example, the relatively wide, flat end of the connector that is to be inserted through the insulating layer and first concrete slab creates a significant amount of resistance to penetration unless the connector is carefully inserted through a hole that is pre-drilled through the insulating layer and which is significantly larger in diameter than the greatest width of the flat end of the Long '733 Patent connector.

In addition, the opposite end of the Long '733 Patent connector that is proximal to the flange has the same flat, narrow dimensions as the distal end inserted through the insulating layer and first concrete layer. Not only is the flat, narrow proximal end relatively difficult to grab by a technician attempting to force the Long '733 Patent connector through the two layers, but it does not provide a reliable surface upon which the connector can receive a strong impact or blow, such as by a hammer or mallet, to aid in the insertion of the connector through insulating and first concrete layers.

From the foregoing it is clear that what are needed are improved designs and methods for manufacturing highly insulative composite wall connectors.

In addition, what are needed are improved designs and methods for making improved connector rods that can be molded in a single step and yet provide means for anchoring the connector within the concrete layers while also providing means for positioning the connector within the insulating layer during the formation of the composite wall structure.

In particular, it would be a vast improvement in the present art to provide connector rods that could be integrally molded in one step without the need to separately mold an elongate connector shaft having means for retaining the shaft within the outer structural layers and a central sleeve portion having a flange and an enlarged central diameter for positioning the connector within the insulating layer.

In addition, what are needed are improved designs and methods for manufacturing improved connector rods that have means for facilitating their penetration through an insulating layer and a first of two structural layers during the formation of the composite wall structure.

In addition, it would be a tremendous advancement in the art to provide improved connectors having means for receiving an impact such as from a hammer or mallet, or to aid in gripping the connector, to facilitate the penetration of the connector rods through the insulating layer and the first structural layer.

Such improved designs and methods for manufacturing connector rods having the aforesaid features are set forth and claimed herein.

SUMMARY OF THE INVENTION

The present invention relates to improved designs and methods for manufacturing a wall connector used in the manufacture of composite wall structures. In particular, such connectors can be manufactured in a single step and may be used in the manufacture of highly insulating wall structures having two concrete layers between which is sandwiched a highly insulating material. Such wall connectors prevent or greatly reduce the flow of heat between the two concrete walls surrounding the insulative material, and also facilitate their placement within the various layers of concrete and insulation material during the manufacturing process of the composite structure. Such insulating wall connectors can be molded in a single step such as by, for example, injection molding, resin transfer molding, or reaction injection molding, thereby eliminating the need to form the connectors in a multi-step fashion as in the Long '733 Patent.

In a preferred embodiment, the connector rod is injection molded from a polycarbonate resin or other high strength resin or moldable plastic material. Another preferred material is a polycarbonate "alloy" consisting of polycarbonate and polybutylene teraphthalate. In some cases, where increased tensile and bending strength are desired, discontinuous fibers such as glass fibers, carbon fibers, mineral fibers, boron fibers, ceramic fibers, and the like may be impregnated within the resin to form a connector rod having increased strength and stiffness. The use of more flexible fibers, such as cellulosic, nylon, or other polymeric fibers would be expected to increase the toughness and decrease the stiffness of the connector rod. Nevertheless, where fibers are unnecessary it will be preferable not to use them due to their increased cost. Whereas in the Long '733 Patent the continuous fibers disclosed therein are the main structural component and are merely bonded together by the resin, the major structural component of the connectors of the present invention is the moldable resin or other plastic material itself into which discontinuous fibers may be impregnated. This allows for the connectors of the present invention to be molded into a wide variety of desired designs having any number of accessories or other variations.

In the past, it was believed that appropriate connectors should have a tensile strength commensurate with the steel connectors they were intended to replace. Hence, connectors such as the Long '733 Patent connector employed continuous fibers of high tensile strength in order to yield a connector having what was erroneously believed to be the minimum required tensile strength necessary to hold the two concrete layers together.

However, studies carried out by the present inventors have shown that connectors formed by pultruding continuous fibers have a tensile strength far exceeding the maximum required in the formation of composite insulating walls. In fact, the more important strength variables are shear strength and bending strength, which also affect the toughness of the connector rod. The inventors have discovered that by using an appropriate resinous material such as polycarbonate, polycarbonate-polybutylene teraphthalate alloy, epoxy or other high strength resins, a connector having more than adequate tensile strength can be injection molded in a single step. Because continuous fibers add little or nothing to the shear strength and bending strength of the connector rod they are generally unnecessary. In fact, in the case where discontinuous fibers are employed, the random orientation of the discontinuous fibers would be expected to impart greater shear strength, bending strength and toughness to the connector compared to continuous fibers.

Of equal or greater importance is that the use of resins or other moldable plastics (whether or not impregnated with discontinuous fibers) allows for an almost endless variety of configurations that can be molded in a single step. In contrast, the pultrusion methods of the past allow for only the simplest, most uniform shapes such as cylinders, rectangles, or hexagonal rods, a common feature being that the diameter along the longitudinal axis is always the same throughout the length of the pultruded article. Any variation in shape of a pultruded rod requires a machining step and/or separate molding or attachment steps to provide the necessary structural features.

In short, because of the discovery by Applicants that it is the shear strength and bending strength rather than the tensile strength that are the more important strength variables, Applicants have taken advantage of the superior manufacturing process of molding a resin in a single step to produce a connector rod of greatly reduced cost and improved design at the same time. Depending on the performance criteria of the composite wall, the frequency of the connectors therein, and the type of resin or other moldable plastic material, more or less fibers will be required in order to provide adequate strength properties. In some cases it may be possible to eliminate them altogether.

In a preferred design, the connector rod has a central shaft having at one end a pointed tip which facilitates the entry of the connector rod through an insulative material and into a first layer of uncured concrete during the manufacture of a composite wall structure. On the opposite end of the connector rod is an enlarged head for receiving the impact of a hammer or mallet, or the grip of a technician, to facilitate the penetration of the connector rod through the insulating layer and the first uncured concrete layer. The combination of the pointed tip at one end and a large elongated head at the opposite end greatly facilitates the use of the connector rod in the manufacture of composite wall structures. The pointed tip helps in piercing the material while the camming effect of the increasing diameter of the pointed tip helps to guide the shaft of the connector through the various layers of material.

Not only is it far quicker and easier for the builder to insert the connector rods of the present invention through the composite layers, but the connector rods can be inserted through an insulating material that has a greatly reduced hole drilled therethrough, or even none at all, due to the pointed surface of the connector rod. In addition, the enlarged head provides greater ease in hammering or malleting the connector rods through a reduced hole or where no hole through the insulating material has been provided.

The connector further includes one or more recessed portions at either end into which uncured concrete can flow and then harden in order to anchor the connector firmly and reliably within the concrete layers of the composite wall structure. For example, a preferred connector has at least one recess within the central shaft proximal to the pointed tip. The vibrational forces imparted by striking the connector rod with a hammer or mallet (or by manual twisting) facilitate the spreading or flow of the yet uncured concrete into the recess within the central shaft. In this way, the connector rod is firmly anchored within the first concrete slab as it cures.

Toward the other end of the connector rod is a flange or other protrusion laterally displaced from the surface of the central shaft, such as a ridge, which comes into abutting contact with the insulating layer to prevent the connector rod from being inserted too far into the insulating layer and first concrete layers. Because of the one-step injection molding process this flange or other protrusion can be molded into the connector rod in a single step.

After a first structural layer has been poured and is yet substantially unhardened, an insulating layer is placed thereon. The insulation layer preferably includes holes drilled therethrough through which the connector rod can be inserted. The pointed tip of the connector rod facilitates penetration of the connector rod through the insulating layer and into the first structural layer. Nevertheless, due to the piercing effect of the pointed tip and the softness of most insulating materials contemplated by the present invention, it may be possible to insert the connector rods directly through an insulating layer that has not been pre-drilled. The flange on the central shaft provides for the insertion of the connector rod through the insulation layer and first structural layer until the preferred depth. Thereafter, the second structural layer is poured onto the remaining surface of the insulation layer.

Finally, when the second concrete layer is poured over the surface of the insulating material from which protrude the ends of the connector rods having the enlarged head, the enlarged head, together with the flange or other protrusion, define a second recessed portion into which the fresh concrete of the second layer can flow. Upon curing, the head portion and the recess provide for the second end of the shear connector rod to be locked into place within the cured cement layer. Together, they resist the separation or collapse of the second structural layer relative to the first structural layer. The first recessed portion of the central shaft within the first structural layer provides for both of these functions.

From the foregoing, an object of the present invention is to provide improved designs and methods for manufacturing highly insulative composite wall connectors.

A further object and feature of the present invention are improved designs and methods for making improved connector rods that can be molded in a single step, and yet provide means for anchoring the connector within the structural layers while also providing means for positioning the connector within the insulating layer during the formation of the composite wall structure.

In addition, another object of the present invention is to provide connector rods that can be integrally molded in one step without the need to separately mold an elongate connector shaft having means for retaining the shaft within the outer structural layers, and a central sleeve portion having a flange and enlarged central diameter for positioning the connector within the insulating layer.

Another object and feature of the present invention is to provide improved connector rods that have means for facilitating their penetration through an insulating layer and a first of two structural layers during the formation of the composite wall structure.

Finally, another object of the present invention is to provide improved connectors having means for receiving an impact such as from a hammer or mallet, or to aid in gripping the connector, and thereby facilitate the penetration of the connector rods through the insulating layer and the first structural layer.

These and other objects and features of the present invention will become more fully apparent from the following description and appended claims, or may be learned from the practice of the invention as set forth hereinafter.

DETAILED DESCRIPTION OF THE PREFERRED EMBODIMENTS

The present invention relates to highly insulative connectors or connector rods having improved design for use in the manufacture of composite wall structures, and methods for the manufacture and use of such connector rods. Such connector rods can be manufactured in a single step to yield connectors that have a wide variety of structural features and accessories therein. Such connector rods are designed to secure two structural layers together with a layer of a highly insulating material sandwiched therebetween. Because the connector rods have a high R value, they prevent or greatly reduce the flow of heat between the two concrete walls compared to metal connectors used in the past. The design of the connector rod facilitates their use by builders while manufacturing the composite wall structure.

The connector rods of the present invention are preferably injection molded from any appropriate resin or other high strength plastic material, although they may also be molded by resin transfer molding, reaction injection molding, or any other single step or relatively simple molding process known in the art. An important criteria is that the manufacturing costs of the molding process be commensurate to the overall cost parameters of the connector rod to be used.

A preferred resinous material is polycarbonate resin because of the ease in which it may be injection molded. Another similar resinous material is polycarbonate-polybutylene teraphthalate alloy, which is less expensive than polycarbonate resins. Other resins such as epoxy resins, thermoset plastics, and other high strength, high R-value materials may be used. An important criteria is to select a resinous material or other plastic having the desired properties of strength and insulation depending on the performance criteria of the composite wall structure to be fabricated.

Although not necessary in many instances, it may be desirable to incorporate within the resinous material or other plastic material discontinuous fibers such as glass fibers, carbon fibers, boron fibers, ceramic fibers, and the like in order to increase the tensile strength, bending strength, and toughness of the connector rod. Discontinuous fibers can also increase the shear strength of the connector rod if adequately randomly dispersed throughout the resinous or other plastic material. Nevertheless, where fibers are not necessary in order to impart greater strength or stiffness to the connector rod, it will be preferable not to use them due to their increased cost.

Because the use of resins or other moldable plastics (whether or not impregnated with discontinuous fibers) allows for an almost endless variety of design configurations that can be molded into a connector rod in a single step, such connector rods can include a wide variety of structural features or accessories without increasing the cost of manufacture.

Figure 1:
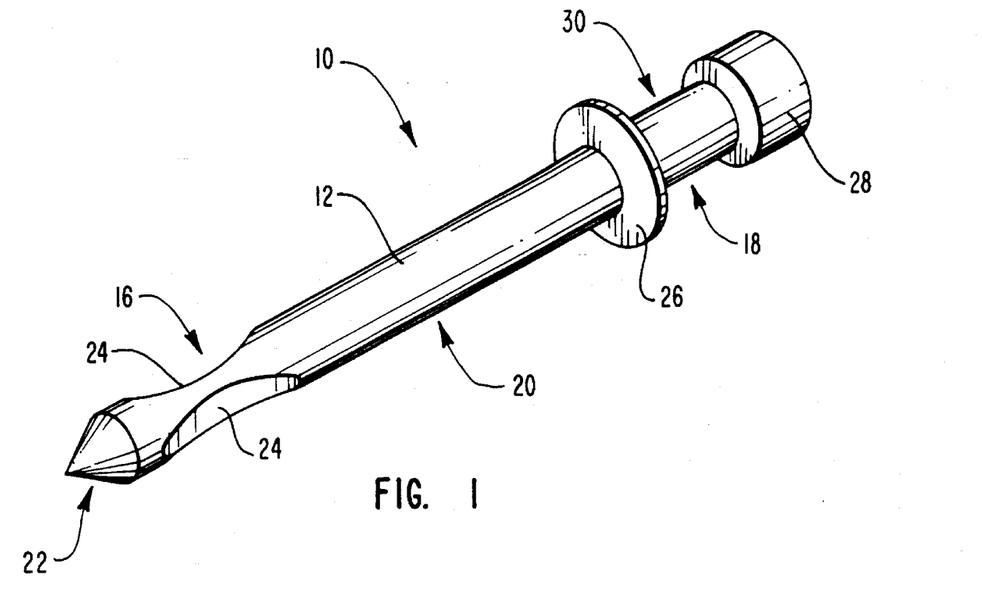
FIG. 1 is a perspective view of an insulating connector rod having a generally circular cross-section.

Referring to FIG. 1, a preferred design of the connector rod 10 of the present invention includes an elongate shaft 12 that is generally cylindrical or ellipsoidal. The connector rod 10 has a penetrating segment 16 at one end, an impact segment 18 at the opposite end, and a mesial segment 20 disposed between the penetrating segment 16 and the impact segment 18. The mesial segment 20 essentially comprises the middle section of the elongate shaft 12 although appropriate accessories or other design features could be included therein to provide further functionality.

At the end of the penetrating segment 16 distal to the mesial segment 20 is a pointed tip 22. Although the pointed tip 22 has a generally conical shape as shown in FIG. 1, it can be of any shape so long as it generally ends in a tip having a substantially reduced diameter relative to the diameter of the elongate shaft 12. The pointed tip 22 facilitates entry of the connector rod 10 through an insulating layer and a first layer of fresh, unhardened structural material, as set forth more fully below.

In addition, the penetrating segment 16 further includes one or more recesses 24 disposed between the mesial segment 20 and the area of the penetrating segment 16 near the pointed tip 22. As set forth more fully below, the penetrating segment 16 is intended to substantially penetrate and be anchored within a first structural layer. The recessed portions 24 greatly aid in the anchoring and securing of the penetrating segment 16 within the first structural layer.

Further up the elongate shaft 12 is the mesial segment which is generally of uniform shape, and may be cylindrical or may have a cross-section of, e.g., an ellipse or cruciform. Near or at the end of the mesial segment 20 distal to the penetrating segment 16 is a flange 26 or other ridge which acts as a means for orienting the connector rod 10 within an insulating layer stacked together with a first structural layer. The mesial segment 20 is intended to occupy, in a close-fitting manner, a hole drilled within the insulating layer or formed by the piercing effect of the pointed tip 22 of the penetrating segment 16 when the connector rod 10 is inserted through the insulating layer and into a first structural layer of yet unhardened material. By definition, then, the length of the mesial segment is generally equal to the thickness of the insulating layer.

The flange 26 or other ridge aids in the placement of the connector rod 10 at the proper depth through the insulating layer and first structural layer. Of course, the flange 26 should be oriented at an angle relative to the elongate shaft 12 which corresponds to the desired angle of orientation of the connector rod 10 through the composite wall structure. If, for example, the connector is intended to be oriented perpendicular to the surface of the insulating layer (FIG. 6A), the flange 26 would preferably be oriented orthogonally to the surface of the elongate shaft 12. However, the flange may be offset at any appropriate angle.

Further up the elongate shaft, away from the penetrating segment 16 is the impact segment 18. (FIG. 1.) The impact segment begins at or near the flange 26 or other ridge along the elongate shaft 12 and terminates at an enlarged head 28 disposed at an end of the impact segment 18 distal to the mesial segment 20. The ridge or flange 26 is said to be at or near (or proximal to) the intersection of the mesial segment 20 and impact segment 18 because of the interplay between the definitions of the three connector rod segments and the layers of the composite wall structure into which the segments will be imbedded, as well as the accuracy of placement of the connector rods within the layers and the thickness of the ridge or flange 26. One of the purposes of the enlarged head 28 is to receive an impact force, such as from a hammer or mallet, or to facilitate the gripping of the connector rod 10 during its insertion through an insulating layer and a first structural layer. In addition, the enlarged head 28 also functions to prevent a second structural layer that is formed around the impact segment 18 from pulling away from the first structural layer and insulating layer.

Acting in tandem therewith, the flange 26 or other ridge prevents the second structural layer from collapsing toward the first structural layer. In essence, the enlarged head 28 and flange 26 or other ridge define a pseudo-recessed portion 30 within the portion of the elongate shaft 12 therebetween, although the portion of the elongate shaft 12 between the enlarged head 28 and flange 26 may have the same diameter as the rest of the elongate shaft 12 (excluding recesses 24). Because of the ease in which the connector rods of the present invention may be injection molded, the pointed tip 22, the recesses 24, the flange 26, and the enlarged head 28 can be quickly and easily formed within the connector rod 10 in a single molding step. (Nevertheless, one may wish to incorporate one or more structural features or accessories into the connector rod using one or more separate molding or forming steps. In addition, a freshly demolded connector rod may, if desired, be structurally altered such as by curving or bending the connector rod while still in an unhardened condition.)

Figure 2:
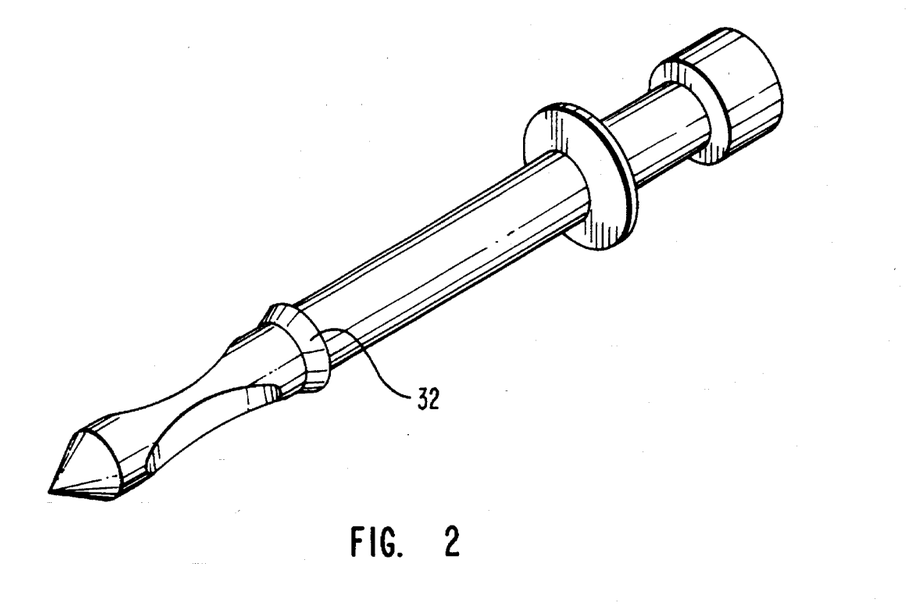
FIG. 2 is a perspective view of the insulative connector rod of FIG. 1 with an angled ridge.

In addition to the structural features of the connector rod 10 shown in FIG. 1, reference to FIG. 2 shows that a cammed ridge 32 can be incorporated along the elongate shaft 12 proximal to the intersection between the penetrating segment 16 and the mesial segment 20. The purpose of the cammed ridge 32 is to provide means for locking the connector rod in place once it has been fully inserted through the insulating layer up to the flange 26.

Figure 3:
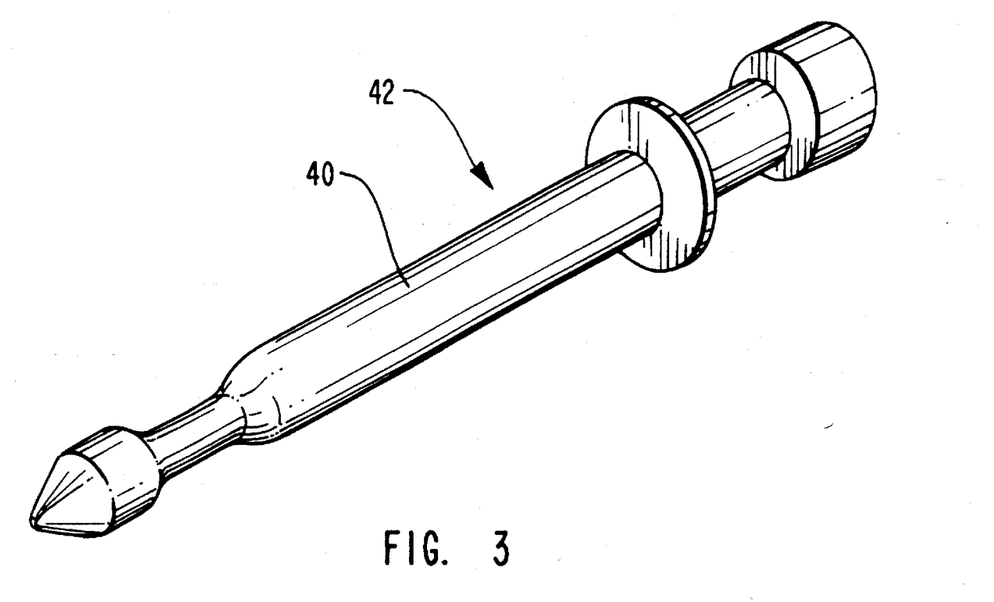
FIG. 3 is a perspective view of an insulating connector rod having a slightly elliptical cross-section.

FIG. 3 shows another alternative embodiment that has substantially the same structural features as the connector rod 10 shown in FIG. 1, except that the elongate shaft 40 and other features of the connector rod 42 have a slightly elliptical cross-section rather than being cylindrical. In most respects, however, the connector rod 40 functions in essentially the same way as the connector rod 10 of FIG. 1. Although the shape of the recesses are different in this embodiment, they perform essentially the same anchoring function as the recesses illustrated in FIGS. 1 and 2. In fact, the shape or depth of the recess or recesses is relatively unimportant so long as the recesses provide adequate means for anchoring the penetrating segment within a first structural layer.

Figure 4:
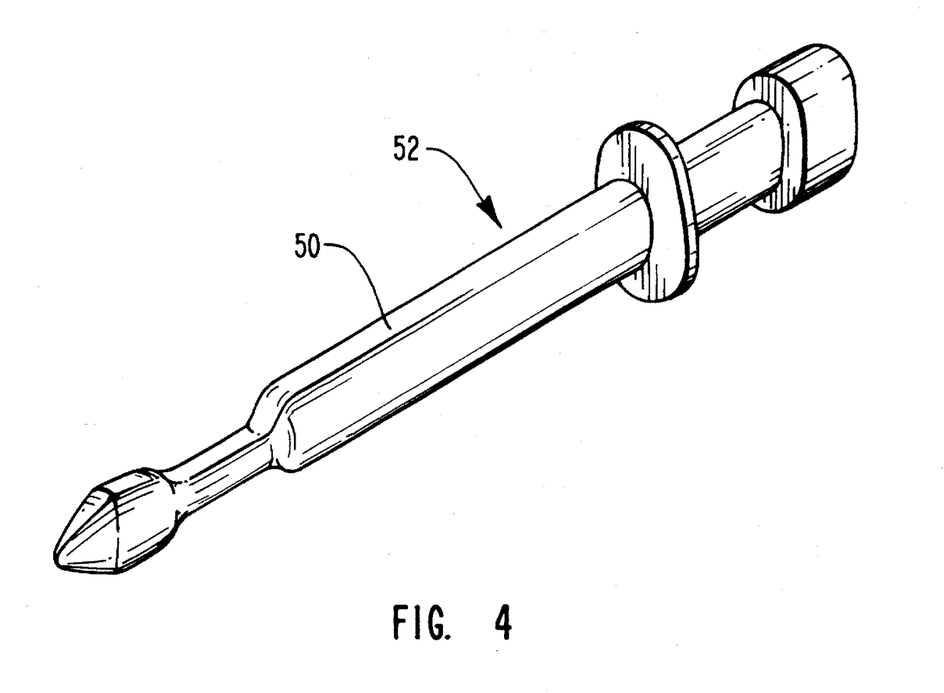
FIG. 4 is a perspective view of an insulating connector rod having a substantially elliptical cross-section.

FIG. 4 shows another embodiment of a connector rod of the present invention similar to that shown in FIG. 3, except that the elongate shaft 50 of connector rod 52 has an even more exaggerated elliptical cross-section compared to the connector rod 40 of FIG. 3. The cross-sectional shape of the elongate shaft and other design features is less important than the functional features themselves. The actual cross-sectional shape may be selected to correspond to the particular design and performance criteria of the composite wall structure to be manufactured. Because the cross-section of the connector rod of Figure is elliptoidal, the pointed tip is more scalloped than conical.

Figure 5:
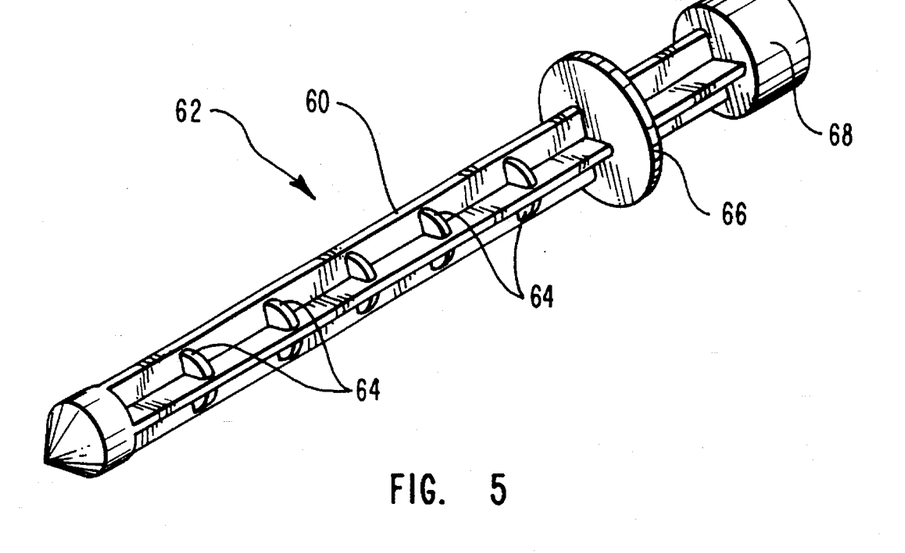
FIG. 5 is a perspective view of an insulating connector rod having a cruciform cross-section.

FIG. 5 illustrates yet another embodiment of the present invention in which the elongate shaft 60 of the connector rod 62 has a generally cruciform cross-section. Within the spaces defined by the fins of the cruciform structure are ridges 64, which aid in the anchoring of the connector rod 62 within a first structural layer. As before, a flange 66 and an enlarged head 68 help to anchor the connector rod 62 within a second structural layer.

Figure 6A:
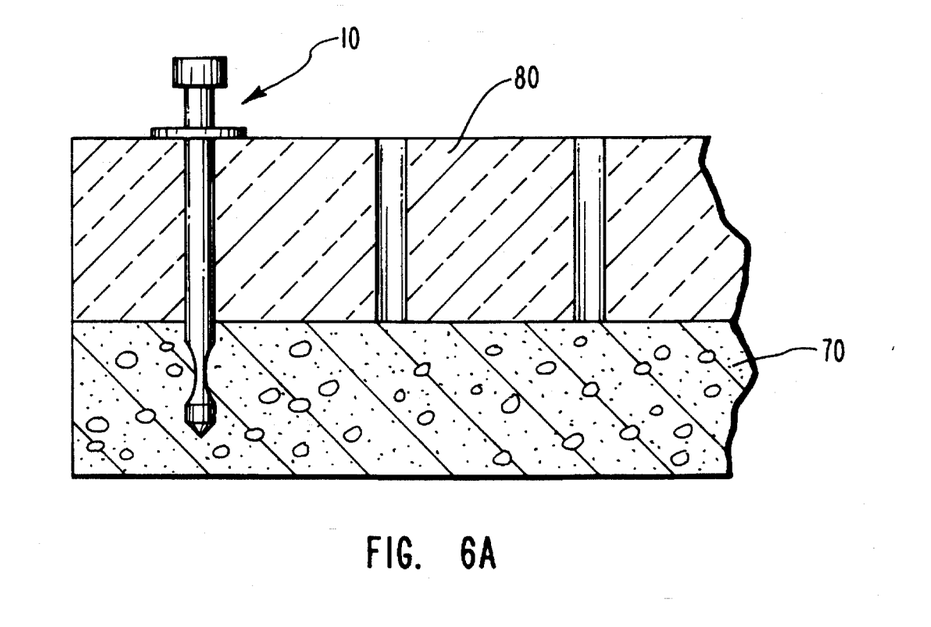
FIG. 6A is a front elevational cross-section view of a partially completed composite wall structure, with angled designation A.

Reference is now made to FIG. 6A, which shows an integral connector rod 10 placed within a front elevational cross-section view of a first structural layer 70 and an insulating layer 80. In a preferred method for manufacturing composite wall structures, a first layer of a structural material is poured into an appropriate form. In general, the first structural layer 70 will be a rectangular slab, although it may also include other design, ornamental or structural features. The only limitation is that it have a thickness or depth great enough to give the structural layer adequate strength and also the ability to firmly anchor the penetrating segment 16 of a connector rod 10 placed therein.

The first structural layer 70 may comprise any suitable material which can flow when initially cast and then harden to form a generally rigid, structural layer. In a preferred embodiment, the first structural layer 70 comprises a concrete material including a hydraulic cement binder, water, an aggregate material and other appropriate admixtures. Concrete is preferred because of its low cost, high strength and ease of casting compared to other materials. Nevertheless, any appropriate structural material may be used, such as high strength polymers, resins or other materials which can flow when cast and later be hardened.

Before the first structural layer 70 obtains such rigidity that a connector rod 10 cannot be placed therein without damaging the ultimate structural integrity and strength of the structural layer, an insulating layer 80 is placed adjacent to the exposed side of the first structural layer 70. The insulating layer may include any appropriate insulating material, such as polystyrene foam, fiberglass, aerogel, xerogel, xonotlite, seagel, polyisocyanate foam, polyurethane foam, urea-formaldehyde foam, and low density, highly insulating cementitious materials. Such insulating materials are given only by way of example, not by limitation.

The insulating layer 80 preferably includes a plurality of holes drilled or punched therethrough, through which the connector rod 10 of the present invention will be inserted. A connector rod 10 is inserted through each of the holes within the insulating layer 80 and also through the first structural layer 70 until the flange 26 prevents further penetration. Angle A shown in FIG. 6A corresponds to the angle of the flange 26 relative to the central shaft of the connector rod 10. Once properly oriented, the penetrating segment 16 (FIG. 1) will substantially reside within the first structural layer 70, while the mesial segment 20 will substantially occupy the hole or space within the insulating layer 80 (FIG. 6A). Because of the piercing effect of the pointed tip 22 of the connector rod 10, it may be possible to drill holes having a substantially smaller diameter compared to the diameter of the elongate shaft 12 of the connector rod 10. In some cases, no holes will be required at all.

Figure 6B:
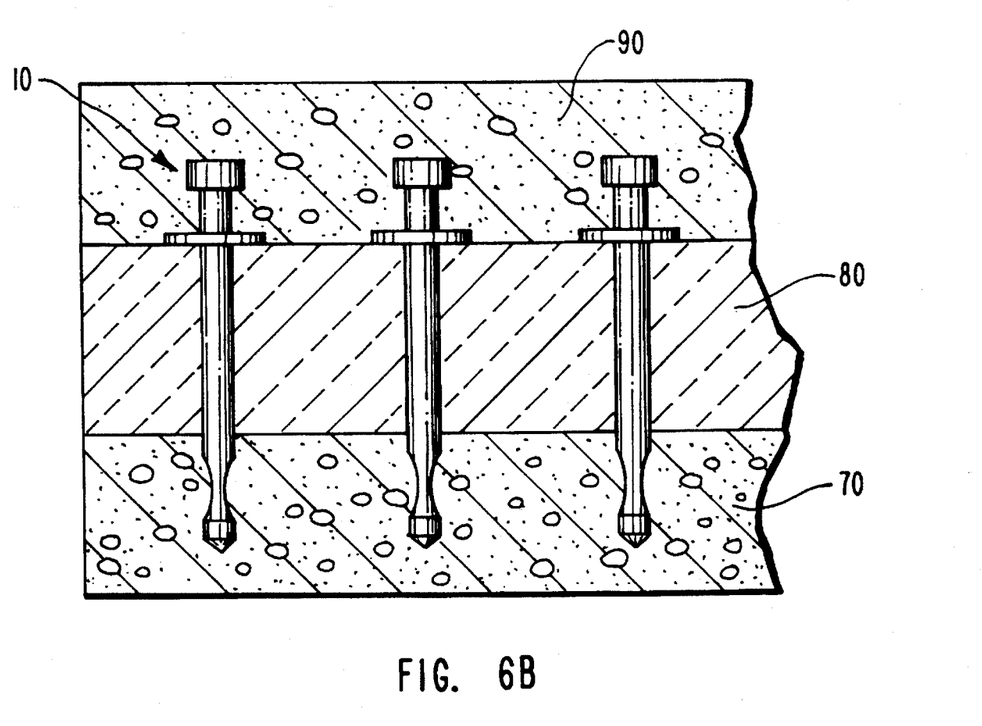
FIG. 6B is a front elevational cross-section view of a composite wall structure.

After the first structural layer 70 has achieved an adequate level of hardness or strength, a second layer of structural material is poured over the surface of the insulating layer 80 to form the second structural layer 90, as shown in FIG. 6B. The second structural layer 90 may also comprise any appropriate material that will initially flow and then harden to form a substantially rigid structural wall. Nevertheless, concrete is preferred due to its low cost, high strength and ease of formation. Although the second structural layer 90 will generally be a rectangular slab, it may also include other designs, structural or ornamental features. The thickness or depth of the second structural layer 90 should be such that it completely, or at least substantially, engulfs the enlarged head 28 of the connector rod 10, thereby providing an adequate anchoring effect of the connector rod 10 within the second structural layer 90. The flange 26 also aids in preventing the hardened second structural layer 90 from collapsing against the first structural layer 70.

In some cases it may be desirable to lay a second insulating layer over the yet unhardened second structural layer, followed by the insertion of additional connector rods through the second insulation layer and second structural layer. Thereafter, a third structural layer will be cast over the surface of the second insulating layer as before. Because of the simplicity of molding the connector rods of the present invention, an adapted connector rod could be molded that would connect all three structural layers together.

The various connector rods described herein were used in experimental composite wall structures and were found to have more than adequate shear strength to hold together the three layers of the composite wall structures that were tested. In fact, in all cases when a stress strong enough to cause a failure of the composite wall structure was applied, it was the concrete structural layer that failed in each instance. The connector rods were left intact.

From the foregoing, it will be appreciated that the present invention provides improved designs and methods for manufacturing highly insulative composite wall connectors.

The present invention also provides improved designs and methods for making improved connector rods that can be molded in a single step, and yet provide means for anchoring the connector rod within the structural layers, while also providing means for positioning the connector within the insulating layer during the formation of the composite wall structure.

In addition, the present invention provides connector rods that can be integrally molded in one step without the need to separately mold an elongate connector shaft having means for retaining the shaft within the outer structural layers, and a central sleeve portion having a flange and enlarged central diameter for positioning the connector within the insulating layer.

Further, the present invention provides improved connector rods that have means for facilitating their penetration through an insulating layer and a first of two structural layers during the formation of the composite wall structure.

Finally, the present invention provides improved connectors having means for receiving an impact such as from a hammer or mallet, or to aid in gripping the connector, and thereby facilitate the penetration of the connector rods through the insulating layer and the first structural layer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to embraced within their scope.

What is claimed and desired to be secured by United States Letters Patent is:

1. A connector rod used in making an insulating composite wall structure including first and second structural layers comprising a hardenable material and an insulating layer having a high thermal resistance disposed between the first and second structural layers, said connector rod comprising a cured resinous or plastic material having a high thermal resistance, said connector rod including:

an elongate shaft having a penetrating segment, an impact segment, and a mesial segment therebetween;

a substantially pointed tip at an end of said penetrating segment distal to said mesial segment for penetrating the insulating layer and the first structural layer while yet in an unhardened state;

an enlarged head at an end of said impact segment distal to said mesial segment, said enlarged head being embedded within the second structural layer when used in making the composite wall structure;

means for orienting said connector rod within the insulating layer at a predetermined depth;

means within said penetrating segment for anchoring said penetrating segment within the first structural layer when substantially hardened; and means within said impact segment for anchoring said impact segment within the second structural layer when substantially hardened, said connector layer having a strength and configuration such that when used in the manufacture of a composite wall structure in which the insulating layer is disposed between the first and second structural layers in a desired configuration said connector rod will remain firmly embedded within the structural layers while substantially retaining the structural layers and insulating layer in the desired configuration, said connector rod having a configuration such that when said connector rod is embedded within the composite wall structure said orienting means does not completely penetrate the insulating layer.

2. A connector rod as defined in claim 1, wherein said means for orienting said connector rod within the insulating layer includes a ridge disposed on a surface of said elongate shaft proximal to where said mesial segment and said impact segment intersect.

3. A connector rod as defined in claim 2, wherein said ridge comprises a flange.

4. A connector rod as defined in claim 3, wherein said flange is oriented at an angle relative to the surface of the elongate shaft corresponding to a desired angle of orientation of the connector rod through the composite wall structure.

5. A connector rod as defined in claim 1, wherein said means within said penetrating segment for anchoring said penetrating segment within the first structural layer comprises a recessed portion within said elongate shaft disposed between said mesial segment and said substantially pointed tip.

6. A connector rod as defined in claim 1, wherein said means within said impact segment for anchoring said impact segment within the second structural layer comprises said enlarged head and a ridge disposed on said elongate shaft which approximately defines where said impact segment and said mesial segment intersect.

7. A connector rod as defined in claim 1, wherein said connector rod comprises a polycarbonate material.

8. A connector rod as defined in claim 1, wherein said resinous or plastic material is impregnated with discontinuous fibers.

9. A connector rod as defined in claim 2, further including means for locking said connector rod in place once said connector rod has been inserted through the insulating layer such that said ridge abuts a surface of the insulating layer, said means for locking being disposed on said elongate shaft proximal to where said penetrating segment and said mesial segment intersect.

10. A highly insulating composite wall structure including:
  (1) a first structural layer comprising a hardenable high strength material;
  (2) a second structural layer comprising a hardenable high strength material;
  (3) a highly insulating layer comprising a material having a high thermal resistance, said insulating layer being disposed between said first and second structural layers in a desired configuration, said first structural layer, said second structural layer, and said insulating layer being secured together by means of a connector rod comprising a material having a high thermal resistance and including:
    (a) an elongate shaft having
      (i) a penetrating segment embedded substantially within said first structural layer;
      (ii) an impact segment embedded substantially within said second structural layer; and
      (iii) a mesial segment disposed substantially within said insulating layer;
    (b) a substantially pointed tip at an end of said penetrating segment distal to said mesial segment for penetrating the insulating layer and the first structural layer while yet in a substantially unhardened state;
    (c) an enlarged head at an end of said impact segment distal to said mesial segment, said enlarged head being embedded within the second structural layer;
    (d) means for orienting said connector rod within said insulating layer at predetermined depth;
    (e) means within said penetrating segment for anchoring said penetrating segment within said first structural layer when substantially hardened; and
    (f) means within said impact segment for anchoring said impact segment within said second structural layer when substantially hardened,
  said connector rod having a strength and configuration such that said connector rod will remain firmly embedded within said structural layers while substantially retaining said structural layers and insulating layer in the desired configuration, said connector rod having a configuration such that said orienting means does not completely penetrate said insulating layer.

11. A highly insulating composite wall structure as defined in claim 10, wherein at least one of said first structural layer and said second structural layer comprises a concrete material.

12. A highly insulating composite wall structure as defined in claim 10, wherein said insulating layer comprises polystyrene foam.

13. A highly insulating composite wall structure as defined in claim 10, wherein said insulating layer comprises fiberglass.

* * * * *

UNITED STATES PATENT AND TRADEMARK OFFICE
CERTIFICATE OF CORRECTION

PATENT NO.   : 5,519,973
DATED        : May 28, 1996
INVENTOR(S)  : David O. Keith and David M. Hansen It is certified that error appears in the above-indentified patent and that said Letters Patent is hereby corrected as shown below:

In claim 1, at col. 12, line 49, after "connector" change "layer" to --rod--.

Signed and Sealed this

Twenty-third Day of June, 1998

Attest:

BRUCE LEHMAN

*Attesting Officer*   *Commissioner of Patents and Trademarks*